（12) United States Patent
Mashimo et al.

(10) Patent No.: US 11,243,884 B2
(45) Date of Patent: Feb. 8, 2022

(54) CONTROL FLOW GUIDED LOCK ADDRESS PREFETCH AND FILTERING

(71) Applicant: Advanced Micro Devices, Inc., Santa Clara, CA (US)

(72) Inventors: Susumu Mashimo, Boxborough, MA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/190,111

(22) Filed: Nov. 13, 2018

(65) Prior Publication Data

US 2020/0151100 A1    May 14, 2020

(51) Int. Cl.
*G06F 12/0862*    (2016.01)
(52) U.S. Cl.
CPC ...... *G06F 12/0862* (2013.01); *G06F 2212/27* (2013.01)
(58) Field of Classification Search
CPC .................................................. G06F 12/0862
USPC ......................................................... 711/118
See application file for complete search history.

(56) References Cited

U.S. PATENT DOCUMENTS

2002/0087800 A1* 7/2002 Abdallah ............. G06F 9/3832
711/137
2004/0260917 A1* 12/2004 Edrich ................ G06F 11/2284
713/1

OTHER PUBLICATIONS

Kagi, A., Burger, D., & Goodman, J. R. (1997, June). Efficient synchronization: Let them eat QOLB. In ACM SIGARCH Computer Architecture News (vol. 25, No. 2, pp. 170-180). ACM.
Quicksilver, https://codesign.llnl.gov/quicksilver.php, 2018.
Trancoso, P., & Torrellas, J. (Aug. 1996). (R) The Impact of Speeding up Critical Sections with Data Prefetching and Forwarding. In icpp (p. 0079). IEEE.

* cited by examiner

*Primary Examiner* — Jae U Yu
(74) *Attorney, Agent, or Firm* — Liang & Cheng, PC (57) ABSTRACT

A method of prefetching target data includes, in response to detecting a lock-prefixed instruction for execution in a processor, determining a predicted target memory location for the lock-prefixed instruction based on control flow information associating the lock-prefixed instruction with the predicted target memory location. Target data is prefetched from the predicted target memory location to a cache coupled with the processor, and after completion of the prefetching, the lock-prefixed instruction is executed in the processor using the prefetched target data.

20 Claims, 8 Drawing Sheets

CONTROL FLOW GUIDED LOCK ADDRESS PREFETCH AND FILTERING

GOVERNMENT RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

A processor in a modern computing system can typically operate much more quickly than a main memory that stores instructions or other data used by the processor. Thus, in many cases a smaller and faster cache memory is used in conjunction with the main memory to provide quick access to the instructions or data. Prefetching of data to the cache occurs when the processor requests data to be stored in the cache before the data is actually needed. Then, when the data is needed, it can be retrieved from the cache without incurring the additional latency of requesting it from the main memory.

Since most programs are executed sequentially or exhibit other regular patterns of execution, instructions or other data can be fetched in program order or according to other identified patterns in the memory access stream. However, prefetching incorrect data, or prefetching data at an inappropriate time can reduce the overall benefit provided by the prefetching implementation.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In one embodiment of a computer system, lock-prefixed instructions are used for thread synchronization, in which a memory location accessed by lock-prefixed instructions executed in multiple threads is shared. When a thread executes a lock-prefixed instruction to acquire a lock on the shared memory location, all other copies of the memory location in cache are invalidated. Thus, execution of a lock-prefixed instruction by another thread is more likely to cause a miss in its private L1 data cache.

In one embodiment, a prefetching mechanism that accurately prefetches data that will be accessed by a lock-prefixed instruction effectively hides the latency of a cache miss while the lock is acquired. Lock-prefixed instructions in many applications access the same memory address repeatedly. Thus, the next target address of such a lock-prefixed instruction can be predicted by recording the previously accessed target address. However, some applications use lock-prefixed instructions that are called by several different code locations and the target address of the lock-prefixed instruction depends on the caller.

Thus, the correlation between the target address accessed by a lock-prefixed instruction and path history preceding the lock-prefixed instruction is used to predict a target location and accurately prefetch the shared target data into the cache in a timely fashion. The control flow path history preceding a lock-prefixed instruction to be executed is matched to prior control flow path history for the previous executions of the same lock-prefixed instruction. The prior control flow path history is in turn correlated with a target memory address identifying the target data for prefetching.

In one embodiment, the path history includes the most recently executed call instruction preceding the lock-prefixed instruction, and/or includes directions of branch instructions and target addresses of jump, branch and call instructions. The program counter of the lock-prefixed instruction and the program counter of the most recently executed call instruction (or other path history information) are hashed to create a unique identifier that is correlated with the target address. The prefetcher also includes a mechanism for throttling prefetching by multiple threads to avoid lock abort operations.

Figure 1:
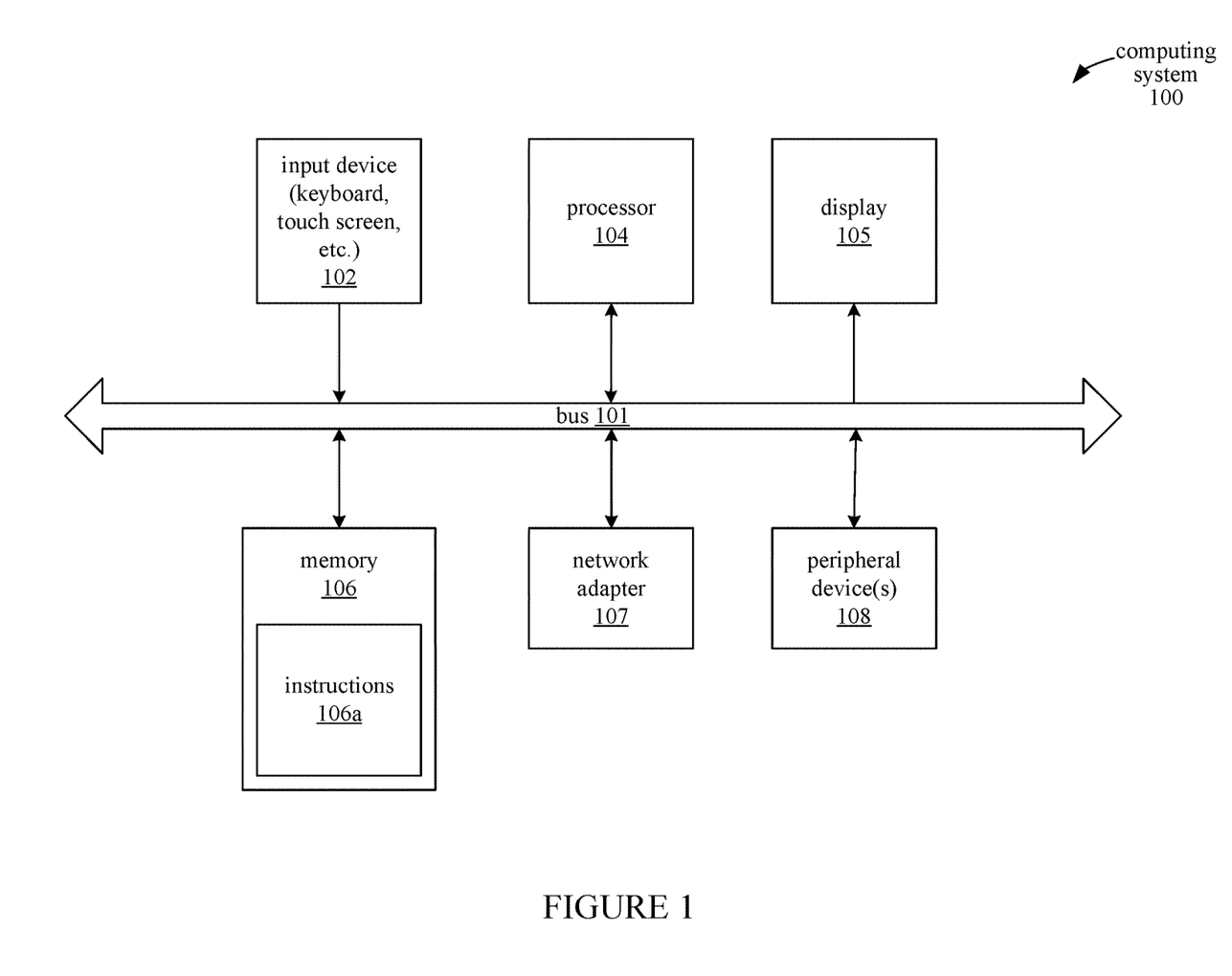
FIG. 1 illustrates an embodiment of a computing system that supports prefetching for lock-prefixed instructions.

FIG. 1 illustrates an embodiment of a computing system 100 which implements the prefetching mechanism as described above. In general, the computing system 100 is embodied as any of a number of different types of devices, including but not limited to a laptop or desktop computer, mobile phone, server, etc. The computing system 100 includes a number of components 102-108 that can communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 are embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 include mass storage devices, location detection devices, sensors, input devices, or other types of devices that can be used by the computing system 100.

Computing system 100 includes a processor 104 that receives and executes instructions 106a that are stored in the main memory 106. As referenced herein, processor 104 represents a processor "pipeline", and could include central processing unit (CPU) pipelines, graphics processing unit (GPU) pipelines, or other computing engines that support memory operations that use virtual addresses. Main memory 106 is part of a memory subsystem of the computing system 100 that includes memory devices used by the computing system 100, such as random-access memory (RAM) modules, read-only memory (ROM) modules, hard disks, and other non-transitory computer-readable media.

In addition to the main memory 106, the memory subsystem also includes cache memories, such as L2 or L3 caches, and/or registers. Such cache memory and registers are present in the processor 104 or on other components of the computing system 100.

Figure 2:
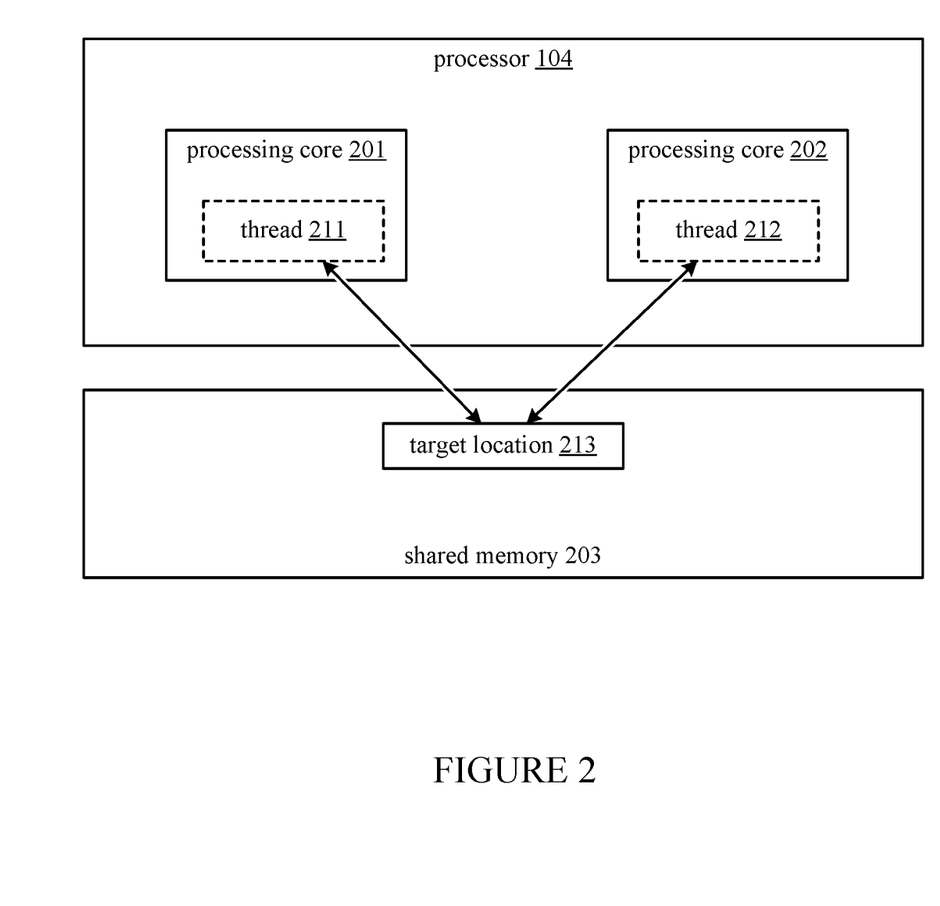
FIG. 2 illustrates the operation of multiple threads in a processor, according to an embodiment.

FIG. 2 illustrates concurrently executing threads 211 and 212 on multiple processing cores 201 and 202 of a processor 104 that access a shared memory location 213, according to an embodiment. Each of the threads 211 and 212 executes a lock-prefixed instruction that accesses the shared target memory location 213 in shared memory 203. In one embodiment, the threads 211 and 212 are synchronized with each other via execution of these lock-prefixed instructions. When thread 211 changes the data in the target location 213 as a result of the lock-prefixed instruction, it invalidates other cached copies of the data. Thus, execution of the lock-prefixed instruction in thread 212 is more likely to cause a cache miss, resulting in added latency, unless prefetching of the data is performed prior to execution of the lock-prefixed instruction in thread 212.

Figure 3:
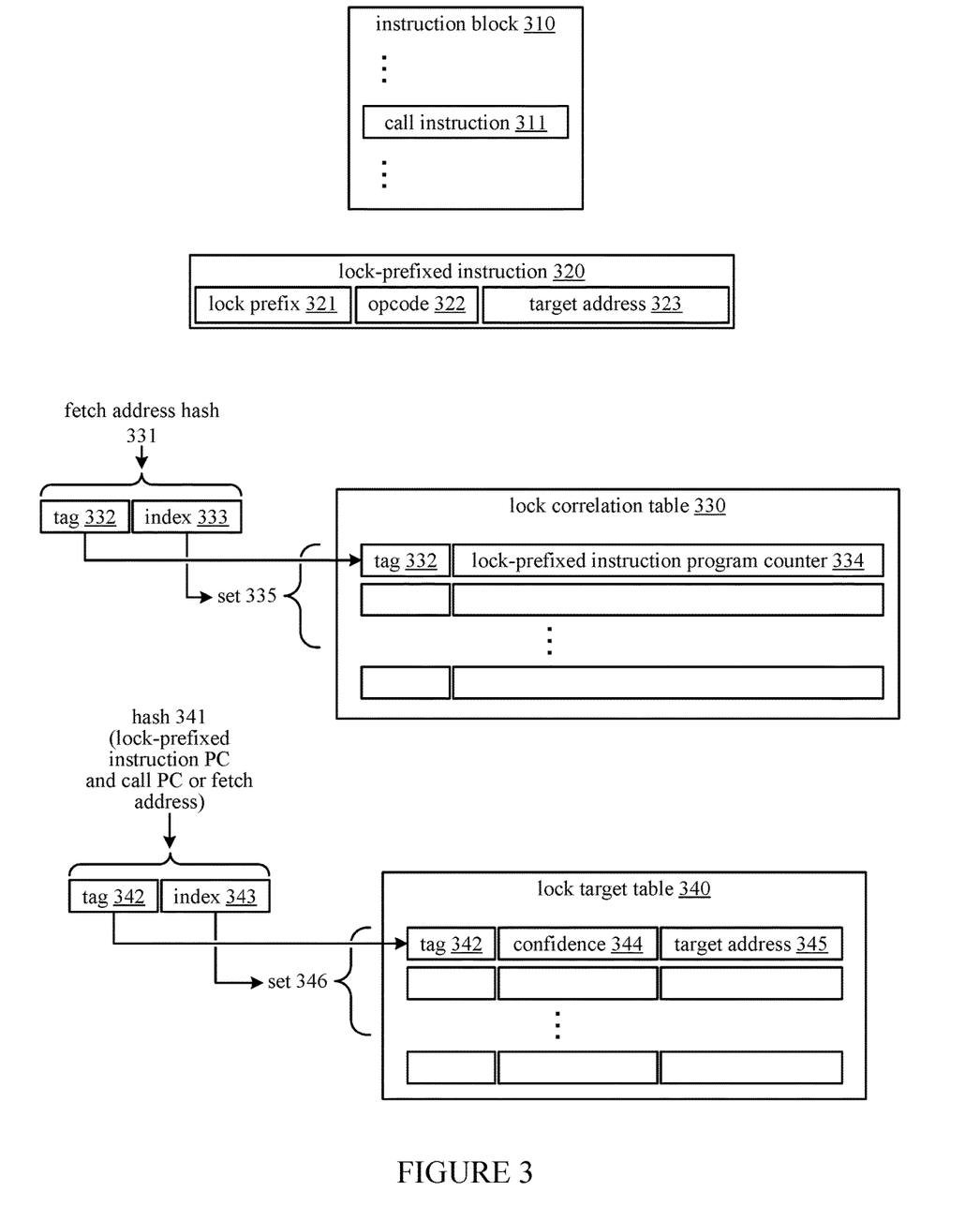
FIG. 3 illustrates instructions and data structures used by a prefetcher, according to an embodiment.

FIG. 3 illustrates instructions and data structures used in the operation of the above described prefetcher, according to an embodiment. During execution of instructions 106a, in the processing core 201, a block of instructions 310 is fetched for execution that includes a call instruction 311. A lock-prefixed instruction 320 is executed following the call instruction 311. The lock-prefixed instruction 320 includes a lock instruction prefix 321. The lock prefix 321 causes a LOCK# signal to be asserted; this ensures exclusive use of the shared memory while the LOCK# signal is asserted (i.e., during the execution of the lock-prefixed instruction 320). The lock-prefixed instruction 320 also includes an opcode 322 and a target address 323, which refers to a target memory location 213 to be accessed by the instruction 320.

In one embodiment, a prefetcher that prefetches data for the lock-prefixed instruction 320 identifies target data for prefetching by referencing a lock correlation table 330 and a lock target table 340. The lock correlation table 330 includes multiple entries, each associating a fetch address of the instruction block 310 (i.e., a base memory address of the instruction block 310) with a program counter 334 of the lock-prefixed instruction 320. In particular, tag bits 332 and index bits 333 are determined by calculating a hash 331 of the fetch address. The index bits 333 are used to select a set 335 of lines in the lock correlation table 330, and the tag 332 is used to select a unique line within the set 335 that contains a program counter 334 for the associated lock-prefixed instruction 320. The lock correlation table 330 thus associates the lock-prefixed instruction 320 with the most recently fetched call instruction 311 via the fetch address of the instruction block 310 including the call instruction 311.

In one embodiment, the lock correlation table 330 associates the lock-prefixed instruction 320 with control flow information in addition to or instead of the fetch address, such as a path history preceding the lock-prefixed instruction 320. In one embodiment, path history information stored in a different storage location (e.g., branch prediction tables) can be used to access the lock correlation table 330.

The lock target table 340 associates the program counter 334 and a program counter of the call instruction 311 (or the fetch address) with a target address 345. The target address 345 is an address referenced by one or more prior instances of the lock-prefixed instruction. In one embodiment, the address 345 is recorded in the lock target table 340 at the time of a prior retiring of the prior instance of the lock-prefixed instruction 320. A lookup in the lock target table 340 is performed with a hash 341, which is generated by hashing the program counter of the lock-prefixed instruction along with the fetch address or a program counter of the most recently executed call instruction 311 prior to the lock-prefixed instruction 320. The hash 341 includes the tag bits 342 and the index bits 343. The index bits 343 are used to select a set 346 of lines in the lock target table 340, and the tag bits 342 are used to select a unique line within the set 346. The entry in the selected line includes the tag bits 342, a confidence value 344, and a target address 345 of the associated lock-prefixed instruction 320.

Figure 4:
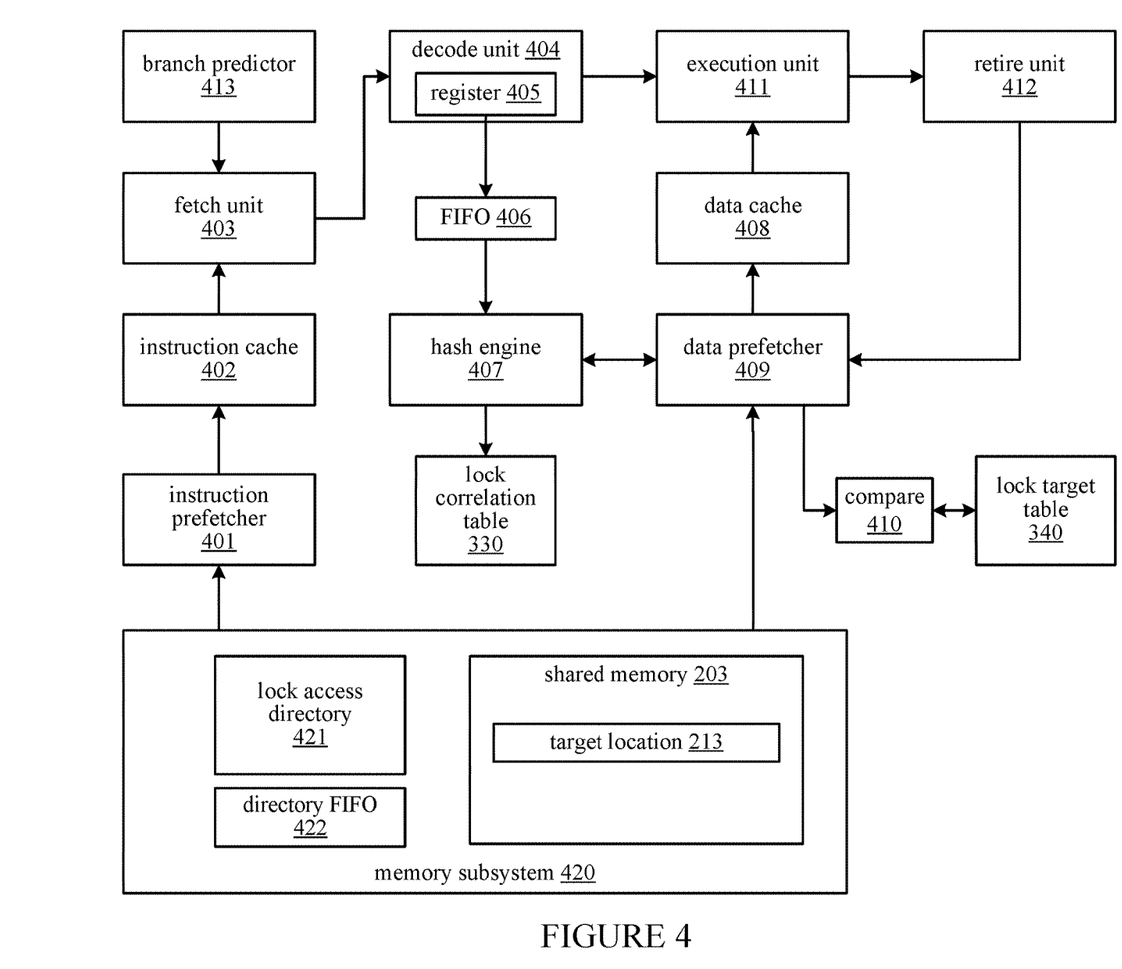
FIG. 4 illustrates components of a processor and memory subsystem supporting a prefetching mechanism, according to an embodiment.

FIG. 4 is a block diagram illustrating hardware components utilized by one or more processing cores (e.g., 201 and/or 202) in which data is prefetched for lock-prefixed instructions based on control flow information, according to an embodiment. Each of the blocks illustrated in FIG. 4 represents hardware circuitry, with functionality defined by the hardware or a combination of hardware, software and/or firmware.

The memory subsystem 420 is implemented using multiple types of memory, with various operating characteristics. For example, the memory subsystem 420 can include lower level cache memory, main memory, nonvolatile memory, etc. The lock correlation table 330 and lock target table 340 are hardware tables in the processing cores 201 and/or 202. The shared memory 203, including target data stored at the target location 213, also resides in the memory subsystem.

During execution of instructions in the processor, the instruction prefetcher 401 prefetches the instructions to the instruction cache 402. The fetch unit 403 fetches a block of instructions (e.g., instruction block 310) to be executed from the instruction cache 402. During this fetch pipeline stage, the fetch address of the retrieved instruction block is looked up in the lock correlation table 330. The lookup is performed by logic in the data prefetcher 409. The hash engine 407 is employed to calculate a hash 331 of the fetch address of the instruction block 310, where the fetch address is provided from the fetch unit 403, and the hash 331 is used to perform the lookup in the lock correlation table 330. If the fetch address hash 331 is not in the lock correlation table 330, a prefetch is not initiated.

The decode unit 404 decodes the instructions in the fetched instruction block 310. Upon decoding of the call instruction 311 in the decode unit 404, the fetch address of the instruction block 310 is stored in a register 405 in the decode unit 404. The fetch address functions as an identifier for the call instruction 311. In alternative embodiments, the call instruction 311 is identified by a different value (e.g., a program counter of the call instruction) instead of the fetch address.

When a lock-prefixed instruction 320 is decoded in the decode unit 404, the fetch address from the decode unit register 405 and a program counter of the lock-prefixed instruction 320 are associated with each other as stored in a first-in first-out (FIFO) queue 406. The FIFO queue 406 is used to store multiple pairs of lock-prefixed instructions and the fetch addresses of the most recently fetched call instructions. The FIFO queue is partially flushed on a branch misprediction and tracks all lock-prefixed instruction and call instruction pairs in the instruction window.

The first time a lock-prefixed instruction 320 is encountered, the prefetch is not triggered because the fetch address hash 331 or other control flow path history has not yet been added to the lock correlation table 330. Updating of the lock correlation table 330 and the lock target table 340 takes place after the lock-prefixed instruction 320 is executed in the execution unit 411 and retired in the retire unit 412. In response to retiring of the lock-prefixed instruction 320, the fetch address from the FIFO queue 406 is hashed in hash engine 407 and the lock correlation table 330 is looked up with the fetch address hash 331. The program counter of the lock-prefixed instruction 320 is stored in the lock correlation table 330 in an entry associated with the hash 331.

In response to the retiring of the lock-prefixed instruction 320, the hash engine 407 also calculates a hash 341 based on the program counter of the lock-prefixed instruction 320 and a program counter of the call instruction 311. The hash 341 is looked up in the lock target table 340, and a target address 345 indicating the target location 213 and a confidence counter 344 is stored in the corresponding entry. The hash value is thus associated with the target address 345 that is referenced by the lock-prefixed instruction 320 at the time the instruction 320 is retired. In one embodiment, the lock target table 340 is updated concurrently with the lock correlation table 330.

In an alternative embodiment, the lock target table 340 is looked up using a hashed value 341 calculated based on the program counter of the lock-prefixed instruction 320 and the fetch address (instead of the program counter of the call instruction). Then the target address of the lock-prefixed instruction 320 is stored in the lock target table 340 entry associated with this hashed value.

If the lock target table 340 already includes an entry for the hash 341 (e.g., added after retiring of a prior instance of the lock-prefixed instruction 320), a comparison circuit 410 compares the target address in the existing entry with the new (i.e., most recent) target address referenced by the lock-prefixed instruction at a time of the present retiring. The confidence counter 344 is incremented when the target addresses are the same, and is decremented if the target addresses are different. The confidence counter 344 is also decremented if the lock-prefixed instruction 320 aborts.

After a record of the prior control flow information (e.g., fetch address, program counter, path history, etc.) associated with a particular lock-prefixed instruction 320 has been established in the lock correlation table 330 and lock target table 340, the data prefetcher 409 uses the control flow information to identify a target address 345 to prefetch for subsequent instances of the lock-prefixed instruction 320. The lock-prefixed instruction 320 is detected in response to fetching the instruction block 310 by determining that a fetch address of the block 310 is in the lock correlation table 330. The presence of the fetch address in the lock correlation table 330 indicates that the instruction block 310 had previously led to a lock-prefixed instruction.

When the lock-prefixed instruction is thus detected, a predicted target memory location 213 in the memory subsystem 420 is determined based on the association between the control flow information (i.e., the fetch address of the instruction block 310 and the program counter of the lock-prefixed instruction 320) for the lock-prefixed instruction 320 and the predicted target memory location 213 in the lock correlation table 330 and the lock target table 340.

A fetch address hash 331 is generated from the fetch address in the hash engine 407, and the hash 331 used to perform a lookup in the lock correlation table 330. When an entry corresponding to the fetch address is found in the lock correlation table 330, the prefetcher 409 identifies a previously recorded program counter 334 in the entry as matching the program counter of the new lock-prefixed instruction.

A further lookup is then performed in the lock target table 340 using a hash 341 of the program counter of the call instruction 311 (or fetch address) and the associated program counter 334 of the lock-prefixed instruction provided by the lock correlation table 330. The prefetcher 409 issues a prefetch request to the memory subsystem 420 for the target memory address 345 associated with the hash 341 in the lock target table 340 if the confidence counter value 344 exceeds a programmable confidence threshold.

An alternative embodiment allows for an earlier prefetch trigger by performing the lookups in the lock correlation table 330 and lock target table 340 using a prefetch address generated by the level 1 (L1) instruction prefetcher 401 instead of the fetch address. With this approach, the prefetch request for the target memory location is issued earlier because the instruction prefetcher 401 prefetches instructions to the instruction cache 402 earlier than the demand fetch of the instruction block 310 by the fetch unit 403.

When the prefetcher 409 issues the prefetch request, target data at the predicted target memory location 213 is prefetched from the shared memory 203 to the data cache 408. The execution unit 411 subsequently executes the lock-prefixed instruction 320 using the prefetched target data in the data cache 408.

In alternative embodiments, the control flow information includes a more extensive path history instead of or in addition to the fetch address and program counter. The path history is or can be recorded by a branch predictor 413 (e.g. a tagged geometric length (TAGE) branch predictor). The branch predictor 413 records the outcomes of all control flow instructions including those prior control flow instructions (e.g., branch, jump, call, etc.) preceding the decoding and execution of the lock-prefixed instruction 320. These outcomes include, for example, directions of branch instructions and target addresses of jump, branch, and call instructions.

When path history from a branch predictor is used to predict a target address for the lock-prefixed instruction, the lock correlation table 330 matches a lock-prefixed instruction with its prior path history. The recording of this association is done at decode time (in program order) when the lock-prefixed instruction 320 is decoded. The FIFO queue 406 links the path history (instead of the fetch address) with the associated lock-prefixed instruction 320.

The training process, in which the control flow path history for a lock-prefixed instruction 320 is associated with a target address, is thus carried out in a similar manner as previously described, but using the path history instead of the fetch address for the call instruction 311. Accordingly, during the prediction phase, the predicted target address 345 is determined by using the path history instead of the fetch address of the call instruction 311 to access the lock correlation table 330.

During the prediction phase, when the lock-prefixed instruction is detected, the prefetcher matches the path history leading to execution of the detected lock-prefixed instruction with a prior path history recorded for the lock-prefixed instruction via a lookup of the present path history in the lock correlation table 330. If a prior path history entry in the lock correlation table 330 matches the present path history, the program counter 334 associated with the matching path history is used to perform a lookup in the lock target table 340. The lookup operation returns the predicted target address 345 for the target location 213.

The above approach for performing prefetches prior to execution of lock-prefixed instructions generally decreases lock acquisition latency when the locks are uncontested. However, when two or more threads attempt to acquire a lock on the same lock variable, the prefetching of the target data could unnecessarily fetch the line with the lock variable in the local level 1 data cache 408 while another thread is ready to acquire the lock, leading to a lock abort. Accordingly, the prefetching scheme additionally employs a prefetch filtering mechanism to avoid lock aborts due to such contention.

Figure 5:
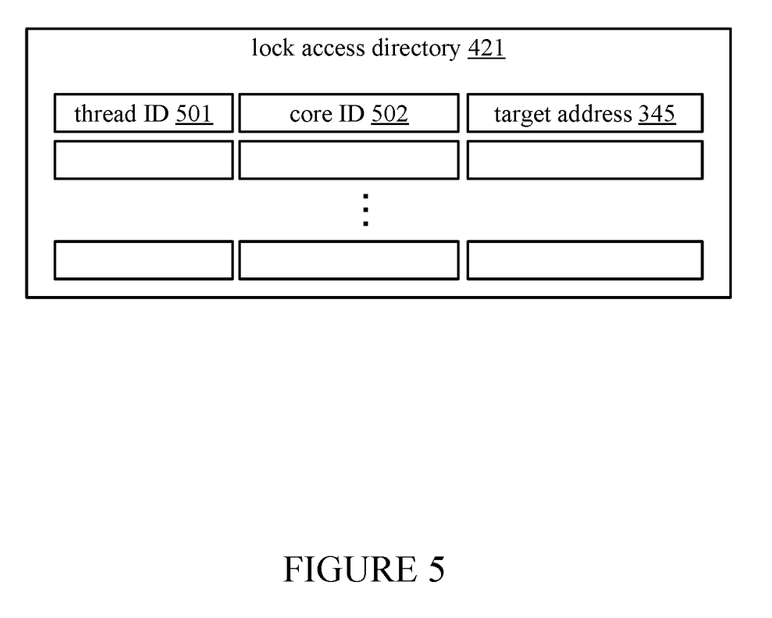
FIG. 5 illustrates a lock access directory, according to an embodiment.

In one embodiment, the memory subsystem 420 includes a lock access directory 421, illustrated in FIG. 5, which is accessible to multiple threads. The lock access directory 421 tracks a thread that is attempting to acquire a lock, and is updated by either a prefetch or a demand request for a lock variable. In one embodiment, the lock access directory 421 is placed next to a shared level 3 (L3) cache or input/output (I/O) die and reduces lock aborts for threads running on the system-on-chip (SoC) or sharing the same L3 cache. The lock access directory 421 tracks the thread that is attempting to acquire a lock variable, and is updated by either a prefetch or a demand request for a lock variable. In one embodiment, the lock access directory 421 is updated exclusively by memory requests from lock-prefixed instructions.

The lock access directory is fully associative and stores one or more target addresses of lock variables for which a lock is being acquired. When a thread sends a prefetch request or a demand request for a lock variable in connection with detecting or executing a lock-prefixed instruction, the prefetch request performs a lookup in the lock access directory 421 of the target address of the lock variable (for a demand request) or the target address of a predicted target memory location 213 (for a prefetch request).

If the lock variable address is not present in the lock access directory 421 (i.e., a directory miss occurs), then the prefetch request adds an entry with a thread identifier 501 for the thread attempting to acquire the lock, a core identifier 502 for the core in which the thread is executed, and the target address 345 of the lock variable. In response to the directory miss indicating that the target address was not found in the lock access directory 421, the prefetch request proceeds as previously described.

If the target address of the lock variable is present in the lock access directory 421, then a directory hit occurs. This indicates that a lock-prefixed instruction in another thread is already in the process of acquiring a lock on the lock variable. If the request is a prefetch request, the prefetch request is dropped and a negative acknowledgment (Nack) is returned to the core from which the prefetch request originated to free up the associated miss address buffer (MAB). If the request is a demand request, then the prefetch request is queued in a directory FIFO buffer 422 (illustrated in FIG. 4).

When a thread successfully acquires a lock and completes its critical section or the atomic operation, it sends a release operation to the lock access directory 421 that specifies the lock variable target address 345. The associated directory entry is then deleted from the lock access directory 421. Then, the oldest thread waiting for access to the released address is serviced from the directory FIFO 422. The serviced thread adds an appropriate entry to the lock access directory 421 with its own thread ID 501, core ID 502, and the same target address 345.

Figure 6:
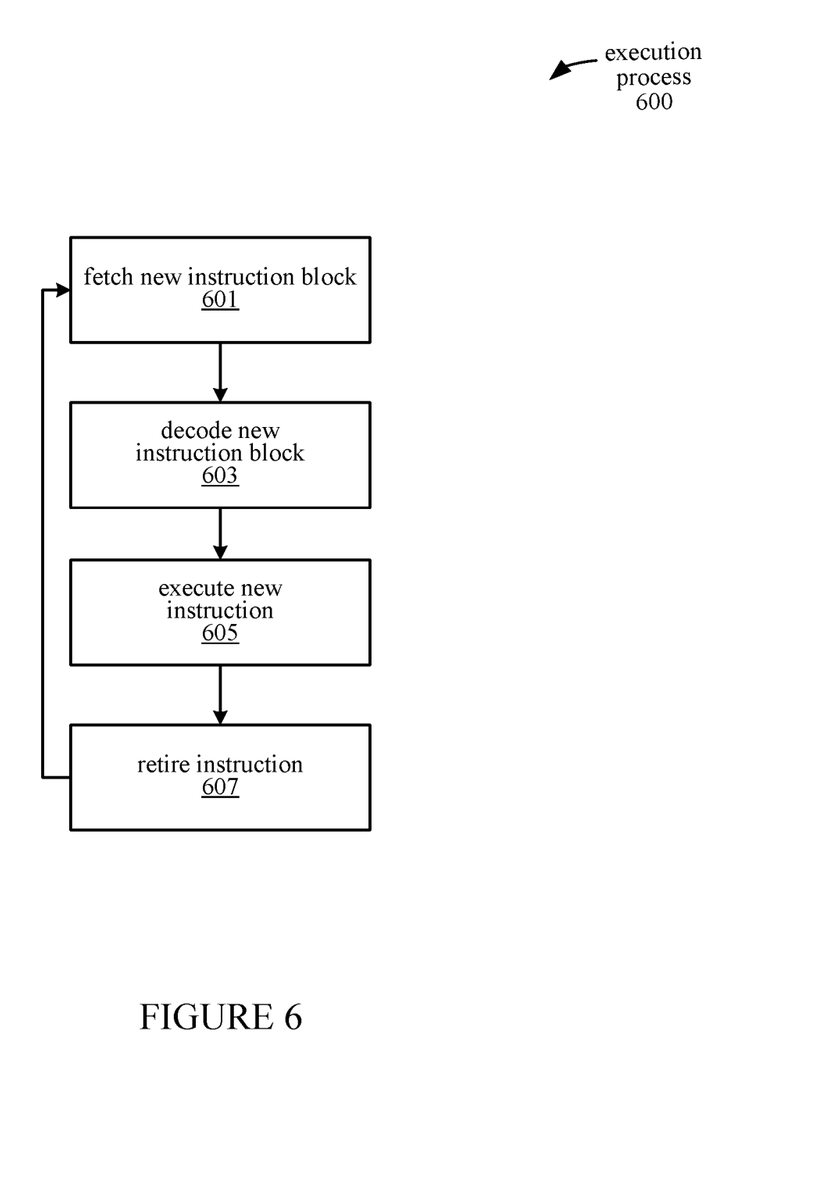
FIG. 6 illustrates a process for executing an instruction in a processing core, according to an embodiment.

FIG. 6 illustrates a process 600 for executing an instruction in a processing core, according to an embodiment. At block 601, the processing core fetches a new instruction block containing the instruction. For example, the fetch unit 403 fetches an instruction block 310 from the instruction cache 402. In the following block 603, the fetched instruction block is decoded in the decode unit 404. At block 605, the processing core executes the new instruction in execution unit 411. The instruction is retired in the retire unit 412, as provided at block 607. Process 600 repeats blocks 601-607 to process multiple instruction blocks of a program.

Figure 7A:
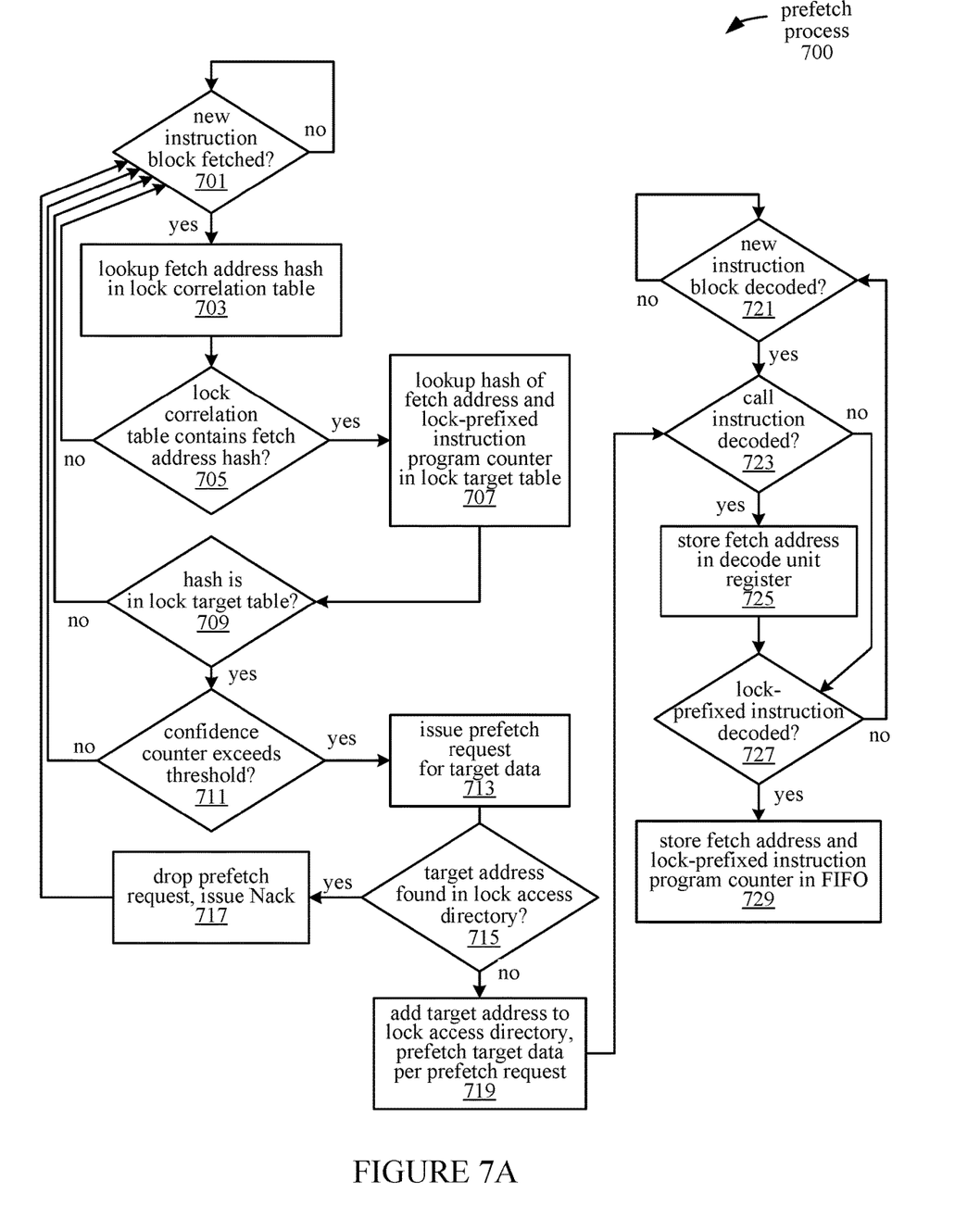
FIGS. 7A and 7B illustrate a process for prefetching target data for a lock-prefixed operation, according to an embodiment.
Figure 7B:
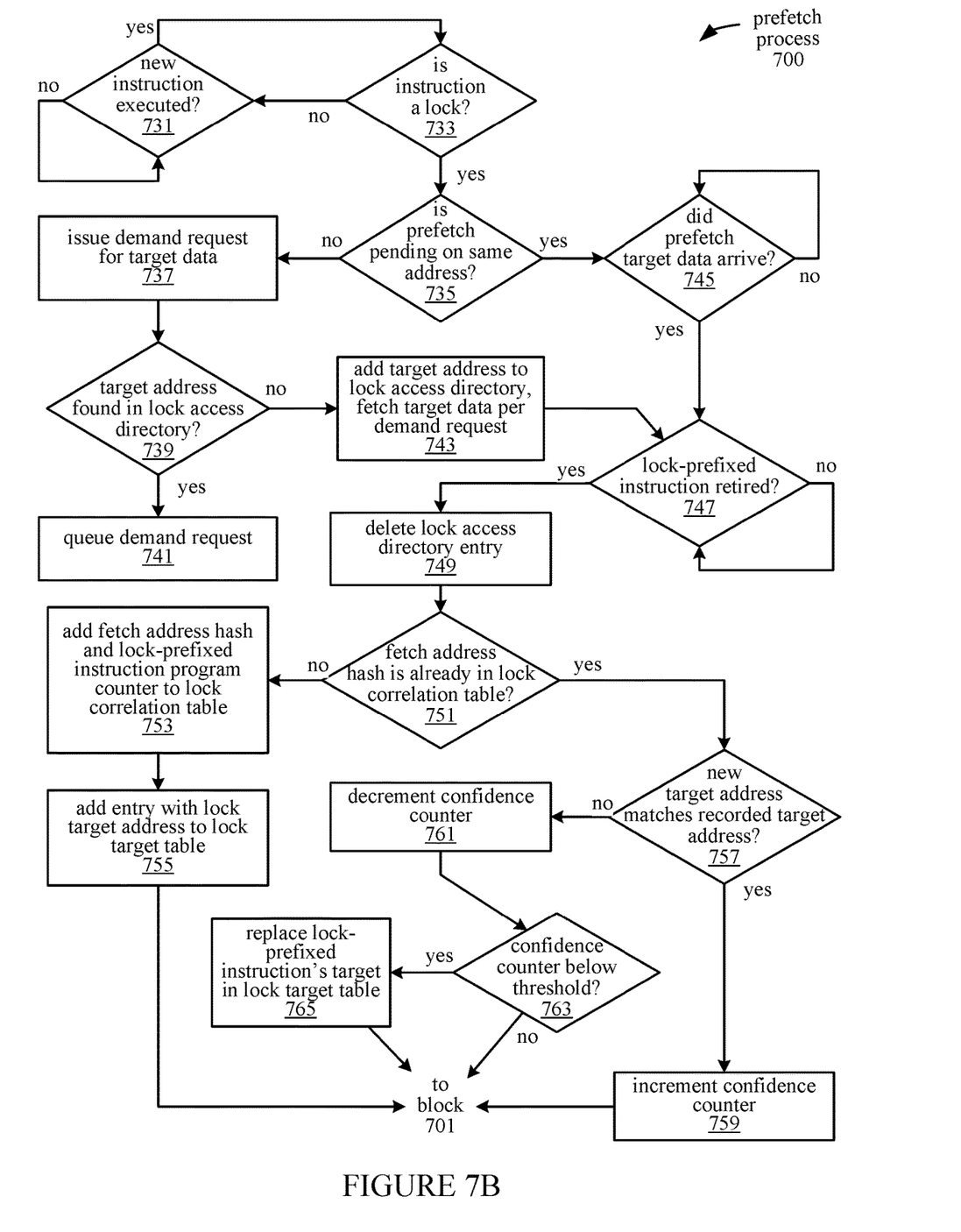

FIGS. 7A and 7B illustrate a prefetching process 700, according to an embodiment. The prefetching process 700 is performed in the various circuit components in the processor 104 and memory 106 of the computing system 100, such as the prefetcher 409, fetch unit 403, decode unit 404, etc. as illustrated in FIG. 4. In one embodiment, some operations in process 700 are performed in response to the operations (i.e., blocks 601-607) of process 600 shown in FIG. 6.

Beginning at block 701, the prefetch process 700 waits until a new instruction block 310 has been fetched for execution in the processor by the fetch unit 403 (e.g., at block 601 in process 600). At block 701, if a new instruction block 310 has been fetched, the process 700 continues at block 703. At block 703, the fetch address of the instruction block 310 is hashed and used to perform a lookup in the lock correlation table 330. At block 705, if the lock correlation table 330 does not contain an entry for the fetch address hash, the process 700 returns to block 701.

At block 705, if the fetch address hash for the instruction block 310 is found in the lock correlation table 330, the process 700 continues at block 707. In an alternative embodiment, the prefetcher 409 determines whether a present path history matches a previously recorded path history referenced in the lock correlation table 330, instead of looking up the fetch address hash in the lock correlation table 330. When the fetch address hash (or present path history) is found in the lock correlation table 330, the process 700 continues from block 705 to block 707.

At block 707, the program counter 334 of the lock-prefixed instruction 320 is determined from the lookup of the hash 331 in the lock correlation table 330. Then the fetch address and the program counter 334 are hashed in the hash engine 407. The resulting hash 341 is used to perform a lookup in the lock target table 340. At block 709, if the hash 341 is not in the lock target table, the process 700 returns to block 701 without triggering a prefetch. At block 709, if the hash 341 (or a hash based on the prior path history) is in the lock target table 340, then a predicted target memory location 213 for the lock-prefixed instruction 320 is specified by the target address 345 corresponding to the hash 341 (or prior path history hash) in the lock target table 340. The process 600 continues at block 711.

At block 711, the confidence counter value 344 corresponding to the hash 341 in the lock target table 340 is determined and compared with a confidence threshold in the comparison logic 410. If the confidence counter value 344 does not exceed the confidence threshold, the process 700 returns to block 701, and a prefetch is not triggered. If the confidence counter 344 exceeds the confidence threshold, the process continues at block 713.

At block 713, the prefetcher 409 determines a predicted target memory location 213 based on the target address 345, and issues a prefetch request for the target data at the predicted target memory location 213, which is expected to be accessed by the detected lock-prefixed instruction 320.

The issued prefetch request is then processed according to the operation of blocks 715-719, describing the operation of a lock access directory 421 that is used to handle lock contention caused when two concurrently executing threads (e.g., threads 211 and 212 as illustrated in FIG. 2) both attempt to acquire a lock on the same target memory location 213. At block 715, a lookup is performed to determine if the target address 345 of the prefetch request is already in the lock access directory 421.

If the target address 345 is found in the lock access directory 421, then this indicates that another thread is in the process of acquiring a lock on the same target address 345. The process 700 thus continues at block 717. At block 717, the prefetch request is aborted to avoid causing a lock abort due to lock contention. Thus, referring to FIG. 2, when a second thread 212 issues a prefetch request while a first thread 211 is acquiring a lock on the same target address 345 for memory location 213, the prefetch for the second thread is aborted in response to a directory hit resulting from the lookup of the target address 345 in the lock access directory 421. A negative acknowledgement (Nack) is transmitted to the core from which the prefetch request originated to notify the core that the prefetch was not performed, and the process returns to block 701 without performing a prefetch.

A directory miss resulting from the lookup of the target address 345 in the lock access directory 421 indicates that the target address 345 is absent. If, at block 715, the target address 345 is absent from the lock access directory 421, then no other thread is in the process of acquiring a lock on the target address 345 and the process 700 continues at block 719. At block 719, the target address 345 is recorded in the lock access directory 421 and the target data is prefetched from the target location 213 to the cache 408 according to the prefetch request. From block 719, the process 700 continues at block 723.

Blocks 723-729 can also be reached from block 721, at which the process 700 waits until a new instruction block is decoded (e.g., at block 603 of process 600). From block 721, when a new instruction block is decoded, the process 700 continues at block 723.

If no call instruction is decoded and no lock-prefixed instruction is decoded, then the process continues from block 723 to block 727, then returns to block 721. At block 723, if a call instruction is decoded, then at block 725, the fetch address of the instruction block 310 is stored in the register 405 in the decode unit 404. From block 725, the process 700 continues to block 727. At block 727, if a lock-prefixed instruction 320 is decoded, the process 700 continues at block 729, and otherwise returns to block 721. At block 729, the fetch address and a program counter of the decoded lock-prefixed instruction are associated with each other as stored in the FIFO queue 406.

Referring to FIG. 7B, the process 700 repeats block 731 until a new instruction is executed (e.g., as provided at block 605 of process 600). At block 733, if the instruction is not a lock-prefixed instruction, the process 700 returns to block 731. If the instruction is a lock-prefixed instruction 320, the process 700 continues at block 735.

At block 735, if a prefetch is pending for the same target address 323 indicated by the lock-prefixed instruction 320, then the process 700 waits for the prefetch target data to arrive, as provided at block 745, before continuing to block 747. At block 735, if a prefetch is not pending for the target address 323, the process 700 continues at block 737. At block 737, a demand request for the target data to be accessed by the lock-prefixed instruction 320 is issued in connection with the execution of the instruction 320 in the execution unit 411.

At block 739, if the requested target address 323 is in the lock access directory 421, then another thread (e.g., concurrently executed in another processing core) is in the process of obtaining a lock on the target data. Thus, the demand request is queued in the directory FIFO 422, per block 741. At block 739, if the target address 323 is not in the lock access directory 421, then the process 700 continues from block 739 to block 743.

At block 743, the target address 345 is added to the lock access directory 421 along with a thread identifier 501 and core identifier 502 for the thread. The corresponding target data is fetched from the target location 213 to satisfy the demand request. The process 700 repeats block 747 until the lock-prefixed instruction 320 is retired. During this time, the lock-prefixed instruction 320 is executed using the fetched target data. When the lock-prefixed instruction 320 retires, the process 700 continues at block 749.

At block 749, the entry for the target address 345 in the lock access directory 421 is deleted. At block 751, a lookup is performed to determine whether the hash of the fetch address stored in the FIFO 406 is already in the lock correlation table 330. If the fetch address hash is not already in the lock correlation table 330, then an entry is added to the lock correlation table 330 associating the fetch address hash 331 with the program counter 334 of the retired lock-prefixed instruction, as provided at block 753.

In an alternative embodiment, a prior path history leading to the lock-prefixed instruction is recorded (e.g., by a branch predictor 413) and associated with the program counter of the lock-prefixed instruction in the lock correlation table instead of or in addition to the fetch address hash 331. The prior path history includes an outcome (e.g., branch directions, target addresses, etc.) of control flow instructions preceding the decoding of the lock-prefixed instruction 320.

At block 755, an entry is also added in the lock target table 340 that includes a hash 341 of the program counter of the lock-prefixed instruction and the fetch address (or a program counter of the call instruction 311). The hash value is generated in the hash engine 407 based on the program counter of the lock-prefixed instruction 320 and fetch address (or alternatively, the program counter of the call instruction most recently decoded prior to decoding of the lock-prefixed instruction 320). The hash value is then associated with the target address 345 referenced by the lock-prefixed instruction 320. From block 755, the process 700 returns to block 701. From block 701, the process 700 continues as previously described.

After the lock correlation table 330 and lock target table 340 are updated in connection with the execution of the lock-prefixed instruction 320, the lock-prefixed instruction 320 can be detected from a subsequent fetch of the instruction block 310 that precedes the lock-prefix instruction 320. In this case, the process 700 arrives at block 751 with the lock correlation table 330 and the lock target table 340 already populated with the control flow information from the prior instance of the lock-prefixed instruction 320. At block 751, if the fetch address hash 331 is already in an entry in the lock correlation table 330 (e.g., from the prior execution of the lock-prefixed instruction 320), then the process 700 continues at block 757. At block 757, a lookup is performed in the lock target table 340 using the program counter 334 corresponding to the fetch address hash 331 in the lock correlation table 330.

The recorded prior target address is compared with the target address that was referenced by the new lock-prefixed instruction 320 at the time the instruction 320 was retired. If the new target address referenced by the retired lock-prefixed instruction 320 matches the corresponding target address 345 already recorded in the lock target table 340, then the confidence counter 344 for the target address 345 is incremented, as provided at block 759.

If, at block 757, the new target address does not match the recorded target address 345, the confidence counter 344 is decremented, as provided at block 761. At block 763, if the new value of the confidence counter 344 is below a threshold, then the target address 345 already recorded in the lock target table 340 is replaced with the target address that was referenced by the new lock-prefixed instruction 320 at the time the instruction 320 was retired, according to block 765. The confidence counter 344 is also decremented if the lock-prefixed instruction 320 is aborted. In this case, the process 700 follows a similar path (i.e., from block 747 to block 761) as when the lock-prefixed instruction is retired. Following blocks 761 and 759, the process 700 returns to block 701 to continue the prefetching operations as previously described.

By the operation of process 700, prefetch operations are performed in response to the detection, based on control flow information, of lock-prefixed instructions that access variables shared between multiple threads. The prefetching mechanism accurately prefetches data that will be accessed by lock-prefixed instructions, reducing latency due to cache misses. The prefetching mechanism also correlates target addresses with the control flow information to accurately predict the target addresses of lock-prefixed instructions prior to execution.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   in response to detecting that an instruction for execution in a processor is a lock-prefixed instruction comprising a lock prefix for obtaining exclusive use of a shared memory location, determining a predicted target memory location for the lock-prefixed instruction based on control flow information associating the lock-prefixed instruction with the predicted target memory location;
   prefetching target data from the predicted target memory location to a cache coupled with the processor; and
   after completion of the prefetching, executing the lock-prefixed instruction in the processor using the prefetched target data.

2. The method of claim 1, further comprising:
   in response to a first decoding of a call instruction in the processor, storing an identifier that identifies the call instruction;

in response to a first decoding the lock-prefixed instruction in the processor, associating the identifier with a program counter of the lock-prefixed instruction in a first-in-first-out (FIFO) queue; and in response to a first retiring of the lock-prefixed instruction in the processor, associating the identifier with the program counter in a lock correlation table, wherein the control flow information comprises the identifier and the program counter.

3. The method of claim 2, further comprising fetching a block of instructions for execution in the processor, wherein:
the block of instructions includes the call instruction; and
the identifier comprises a fetch address indicating a base address of the block of instructions.

4. The method of claim 2, further comprising, in response to a second retiring of the lock-prefixed instruction:
identifying a first target address associated with the lock-prefixed instruction based on a lookup of the program counter in a lock target table;
comparing the first target address with a second target address referenced by the lock-prefixed instruction at a time of the second retiring;
incrementing a confidence counter associated with the first target address when the first target address matches the second target address;
decrementing the confidence counter in response to one of:
aborting the lock-prefixed instruction, or
determining that the second target address differs from the first target address; and
after decrementing the confidence counter, if the confidence counter is less than a threshold, replacing the first target address with the second target address in the lock target table.

5. The method of claim 1, further comprising, in response to retiring of the lock-prefixed instruction in the processor:
generating a hash value based on a first program counter of the lock-prefixed instruction and a second program counter of a call instruction most recently decoded prior to decoding of the lock-prefixed instruction; and
in a lock target table, associating the hash value with a target address referenced by the lock-prefixed instruction.

6. The method of claim 1, wherein the detecting of the lock-prefixed instruction comprises, in response to fetching a block of instructions for execution in the processor, determining that an entry for a fetch address of the block is stored in a lock correlation table.

7. The method of claim 6, further comprising, in response to determining that the entry for the fetch address is in the lock correlation table:
generating a hash value based on a program counter in the entry; and
determining the predicted target memory location based on a first target address associated with the hash value in a lock target table.

8. The method of claim 1, further comprising:
determining a confidence value associated with a first target address;
comparing the confidence value with a confidence threshold; and
determining the predicted target memory location based on the first target address when the confidence value is greater than the confidence threshold.

9. The method of claim 1, further comprising:
in response to a prior decoding of the lock-prefixed instruction, recording a prior path history for the lock-prefixed instruction, wherein the prior path history includes an outcome for each of one or more prior control flow instructions preceding the prior decoding; and in response to determining that a present path history leading to said execution of the lock-prefixed instruction matches the recorded prior path history, determining the predicted target memory location based on a first target address associated with the prior path history.

10. The method of claim 1, further comprising:
prior to prefetching the target data, performing a lookup in a lock access directory of a target address of the predicted target memory location;
in response to a first indication that the target address is absent from the lock access directory, recording the target address in the lock access directory, wherein the prefetching of the target data is performed in response to the first indication; and
in response to a second indication that the predicted target memory location is present in the lock access directory, queuing the prefetching of the target data.

11. A processing device, comprising:
a prefetcher configured to:
in response to detecting that an instruction is a lock-prefixed instruction comprising a lock prefix for obtaining exclusive use of a shared memory location, determine a predicted target memory location for the lock-prefixed instruction based on control flow information associating the lock-prefixed instruction with the predicted target memory location, and
prefetch target data from the predicted target memory location to a cache; and
an execution unit coupled with the prefetcher and the cache and configured to, after completion of the prefetching, execute the lock-prefixed instruction using the prefetched target data.

12. The processing device of claim 11, further comprising:
a register in a decode unit coupled with the execution unit and configured to, in response to a first decoding of a call instruction in the processor, store a fetch address that identifies the call instruction, wherein the fetch address indicates a base address of a block of instructions including the call instruction;
a first-in-first-out (FIFO) queue coupled with the register and configured to, in response to a first decoding of the lock-prefixed instruction in the decode unit, associate the fetch address with a program counter of the lock-prefixed instruction; and
a lock correlation table configured to, in response to a first retiring of the lock-prefixed instruction in the processing device, associate the fetch address with the program counter, wherein the control flow information comprises the fetch address and the program counter.

13. The processing device of claim 11, further comprising:
a hash engine configured to generate a hash value based on a program counter of the lock-prefixed instruction and a fetch address that identifies a call instruction most recently decoded prior to decoding of the lock-prefixed instruction;
a lock target table configured to, in response to a first retiring of the lock-prefixed instruction in the processing device, associate the hash value with a first target address referenced by the lock-prefixed instruction at a time of the first retiring; and a comparison circuit coupled with the lock target table and configured to, in response to a second retiring of the lock-prefixed instruction:
compare the first target address with a second target address referenced by the lock-prefixed instruction at a time of the second retiring,
increment a confidence counter associated with the first target address when the first target address matches the second target address, and
decrement the confidence counter when the second target address differs from the first target address.

14. The processing device of claim 11, wherein:
the prefetcher is further configured to:
detect the lock-prefixed instruction by, in response to fetching a block of instructions for execution in the processor, determine that a fetch address of the block is in a lock correlation table,
in response to determining that the fetch address is in the lock correlation table, identify a program counter corresponding to the fetch address in the lock correlation table as a program counter of the lock-prefixed instruction, and
determine the predicted target memory location based on the first target address when a confidence value associated with a first target address exceeds a confidence threshold; and
the device further comprises a hash engine coupled with the prefetcher and configured to, based on the fetch address and the program counter, generate a hash value for looking up the first target address in a lock target table.

15. The processing device of claim 11, further comprising:
a branch predictor coupled with the processor and configured to, in response to a prior decoding of the lock-prefixed instruction, record a prior path history for the lock-prefixed instruction, wherein the path history includes an outcome for each of one or more prior control flow instructions preceding the prior decoding,
wherein the prefetcher is further configured to, in response to determining that a present path history leading to said execution of the lock-prefixed instruction matches the recorded prior path history, determine the predicted target memory location based on a first target address associated with the prior path history in a lock correlation table.

16. The processing device of claim 11, further comprising a lock access directory coupled with the prefetcher and configured to store one or more target addresses, wherein the prefetcher is further configured to:
prior to prefetching the target data, lookup in the lock access directory a target address of the predicted target memory location;
in response to a first indication that the target address is absent from the lock access directory, record the target address in the lock access directory, wherein the prefetching of the target data is performed in response to the first indication; and
in response to a second indication that the predicted target memory location is present in the lock access directory, abort the prefetching of the target data.

17. A computing system, comprising:
a memory subsystem configured to store target data;
a cache;
a prefetcher coupled with the cache and the memory subsystem, wherein the prefetcher is configured to:
in response to detecting that an instruction is a lock-prefixed instruction comprising a lock prefix for obtaining exclusive use of a shared memory location, determine for the lock-prefixed instruction a predicted target memory location in the memory subsystem based on control flow information associating the lock-prefixed instruction with the predicted target memory location, and
prefetch the target data from the predicted target memory location to the cache; and
a first execution unit coupled with the prefetcher and the cache and configured to, after completion of the prefetching, execute the lock-prefixed instruction using the prefetched target data in the cache.

18. The computing system of claim 17, further comprising:
a lock correlation table configured to associate a program counter of the lock-prefixed instruction with a path history preceding the lock-prefixed instruction, wherein the path history includes the control flow information; and
a lock target table configured to associate the program counter with a first target address referenced by the lock-prefixed instruction at a time of a prior retiring of the lock-prefixed instruction.

19. The computing system of claim 17, wherein the prefetcher is further configured to:
match a path history preceding the lock-prefixed instruction with a recorded prior path history associated with a program counter of the lock-prefixed instruction in a lock correlation table, wherein the prior path history includes the control flow information; and
in response to matching the path history with the recorded prior path history, determine the predicted target memory location based on a recorded target address associated with the program counter in a lock target table.

20. The computing system of claim 17, further comprising:
a first processing core comprising the first execution unit;
a second processing core in a processor with the first processing core, wherein the first processing core is configured to execute a first thread concurrently with execution of a second thread in the second processing core; and
a lock access directory coupled with the prefetcher and configured to, prior to prefetching the target data, record a target address of the predicted target memory location when the target address is absent from the lock access directory, wherein the prefetcher is further configured to, in response to an indication that the target address is present in the lock access directory, abort a second prefetch operation for a second lock-prefixed instruction detected in the second processing core.

* * * * *